United States Patent
Park et al.

(10) Patent No.: US 12,036,541 B2
(45) Date of Patent: Jul. 16, 2024

(54) MXENE NANODOT CORE-CARBON SHELL MULTIFUNCTIONAL CATALYST AND METHOD OF PREPARING THE SAME

(71) Applicant: Research & Business Foundation Sungkyunkwan University, Suwon-si (KR)

(72) Inventors: Ho Seok Park, Hwaseong-si (KR); Min Gyu Jung, Siheung-si (KR); Seung Hun Roh, Seongnam-si (KR); Jung Kyu Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 24 days.

(21) Appl. No.: 17/840,984

(22) Filed: Jun. 15, 2022

(65) Prior Publication Data

US 2022/0395822 A1 Dec. 15, 2022

(30) Foreign Application Priority Data

Jun. 15, 2021 (KR) ........................ 10-2021-0077317

(51) Int. Cl.
| | |
|---|---|
| B01J 35/00 | (2024.01) |
| B01J 27/22 | (2006.01) |
| B01J 27/24 | (2006.01) |
| B01J 35/33 | (2024.01) |
| B01J 35/39 | (2024.01) |
| B01J 35/51 | (2024.01) |
| B01J 37/02 | (2006.01) |
| B01J 37/10 | (2006.01) |

(52) U.S. Cl.
CPC .............. *B01J 35/19* (2024.01); *B01J 27/22* (2013.01); *B01J 27/24* (2013.01); *B01J 35/33* (2024.01); *B01J 35/39* (2024.01); *B01J 35/51* (2024.01); *B01J 37/0234* (2013.01); *B01J 37/10* (2013.01)

(58) Field of Classification Search
CPC ........ B01J 35/0006; B01J 27/22; B01J 27/24; B01J 35/0033; B01J 35/004; B01J 35/08; B01J 37/0234; B01J 37/10
USPC .................................. 502/177, 180; 428/403
See application file for complete search history.

(56) References Cited

U.S. PATENT DOCUMENTS

| | | | | |
|---|---|---|---|---|
| 11,484,867 B2 * | 11/2022 | Percival | ................... | B01J 37/16 |
| 11,571,689 B2 * | 2/2023 | Jiang | ........................ | B01J 27/22 |

FOREIGN PATENT DOCUMENTS

| | | | | | |
|---|---|---|---|---|---|
| CN | 105070513 A | * | 11/2015 | ............. | H01G 11/22 |
| CN | 105197992 A | * | 12/2015 | ............. | B82Y 30/00 |

(Continued)

OTHER PUBLICATIONS

Tan, et al., "Carbon-coated MoSe2/Mo2CTx (MXene) heterostructure for efficient hydrogen evolution", Materials Science and Engineering B 271, 2021, 8 pages.

(Continued)

*Primary Examiner* — Patricia L. Hailey
(74) *Attorney, Agent, or Firm* — NSIP Law

(57) ABSTRACT

An embodiment of the present invention provides a MXene nanodot core-carbon shell multifunctional catalyst including a MXene nanodot core and a carbon shell surrounding the MXene nanodot core. By introducing the carbon shell surrounding the nanodot core, the stability of the catalyst is ensured, thereby providing effects in that the catalyst may function under various conditions.

16 Claims, 10 Drawing Sheets

(56) References Cited

FOREIGN PATENT DOCUMENTS

| CN | 108258218 | A | * | 7/2018 | ............ H01M 4/362 |
|---|---|---|---|---|---|
| CN | 108660473 | A | * | 10/2018 | ............ B82Y 30/00 |
| CN | 109449402 | A | * | 3/2019 | ............ C01B 32/15 |
| CN | 112038601 | A | * | 12/2020 | ............ B82Y 30/00 |
| CN | 113461011 | A | * | 10/2021 | ............ B01D 61/40 |
| CN | 113718281 | A | * | 11/2021 | .......... C01B 32/184 |
| KR | 20170046063 | | | 4/2017 | |
| WO | WO-2021113509 | A1 | * | 6/2021 | ......... C01B 21/0602 |

OTHER PUBLICATIONS

Kong, et al., "A DFT study of Ti3C2O2 MXenes quantum dots supported on single layer graphene: Electronic structure an hydrogen evolution performance", Frontiers of Physics, 16(5), 53506 (2021), 8 pages.

Du, et al., "BiVO4@ZnIn2S4/Ti3C2 MXene quantum dots assembly all-solid-state direct Z-Scheme photocatalysts for efficient visible-light-driven overall water splitting", Applied Materials Today 20, 2020, 11 pages.

* cited by examiner

MXENE NANODOT CORE-CARBON SHELL MULTIFUNCTIONAL CATALYST AND METHOD OF PREPARING THE SAME

CROSS REFERENCE TO RELATED APPLICATION

The present application claims priority to Korean Patent Application No. 10-2021-0077317, filed Jun. 15, 2021, the entire contents of which is incorporated herein for all purposes by this reference.

BACKGROUND OF THE INVENTION

Field of the Invention

The present invention relates to a catalyst using a MXene nanodot core. More particularly, the present invention relates to a catalyst in which a MXene nanodot core is surrounded by a shell including carbon material, and is directed to providing a catalyst and a method of preparing the same, by using chemical interaction between a zero-dimensional MXene nanodot core and a carbon shell.

Description of the Related Art

Catalysts are an essential element in chemical processes to increase productivity and are used in a wide range of fields, such as the petrochemical industry, environment, food, medicine, and energy. In particular, as the demand for eco-friendly energy increases due to environmental problems, catalysts that may maximize eco-friendly energy production efficiency through electrochemical water splitting are attracting attention as a key element in the future energy industry.

Platinum-based catalysts have been actively studied based on a volcano plot calculated from a current density of hydrogen evolution reaction (HER) and currently have the highest performance, but due to limited reserves of platinum, are difficult to commercialize due to inefficiency, and also have a disadvantage in that the platinum-based catalyst have low stability when operating in an electrolyte. Carbon-based catalysts have high stability and conductivity due to excellent physical properties inherent in the material, but have a problem of low efficiency. Therefore, a strategy for improving water electrolysis efficiency using a hybrid catalyst of transition metal-based material with high activity and carbon-based support material with excellent electrical characteristics has been used.

MXene material is two-dimensional structural material including transition metal and carbon, and thus, it has excellent conductivity, elongation characteristics, and transmittance. However, there are problems in that there are difficulties controlling a functional group, oxidation stability is not good, and there are difficulties in application to surface catalysts.

Also, catalyst materials of the related art have distinct limitations in that the catalyst materials have single functionality since the catalyst materials can be used only at a specific pH to take advantage of thermodynamic advantages.

Based on a zero-dimensional nanomaterial converted from a two-dimensional MXene through the present invention, a special structure in which carbon surrounds a MXene nanodot core with a shell structure is designed, resulting in high catalytic performance and improvement of stability even under oxygen conditions at the same time, thereby extending the lifespan of catalysts, ensuring market competitiveness through cheap materials, and providing effects of improving catalytic performance by controlling electrical characteristics and a surface energy level. Also, ultimately, the present invention aims to develop a versatile, multifunctional, high-performance catalyst that is available at various pHs.

Document of Related Art (Patent Document 1) Korea Patent Publication No. 10-2018-0135737

SUMMARY OF THE INVENTION

Therefore, the present invention has been made in view of the above problems, and it is an object of the present invention to provide a multifunctional, high-performance catalyst and a method of preparing the same, in which the catalyst is commonly available and has stability by overcoming the limitation of pH conditions when using catalysts, with respect to catalysts related to the energy storage field.

Also, due to strong reactivity of MXene material with oxygen, the performance as a catalyst is greatly reduced in an oxygen environment, and thus, provided is a MXene catalyst that is degraded even under an oxygen condition.

The technical object to be achieved by the present invention is not limited to the above-described technical object, and other technical object that are not mentioned will be clearly understood by those of skilled in the art from the following description.

To accomplish the above object, according to one aspect of the present invention, there is provided a MXene nanodot core-carbon shell multifunctional catalyst including a MXene nanodot core and a carbon shell surrounding the MXene nanodot core.

In addition, in an embodiment of the present invention, the MXene nanodot core is an inorganic compound of an $M_{n+1}X_n$ composition, wherein M indicates transition metal, X indicates carbon, nitrogen, or a combination thereof, and n is a natural number from 1 to 4.

In an embodiment of the present invention, M indicates the transition metal including at least one selected from among Sc, Y, Lu, Ti, Zr, Hf, V, Nb, Ta, Cr, Mo, and W.

In an embodiment of the present invention, a diameter of the MXene nanodot core is 10 nm to 15 nm.

In an embodiment of the present invention, a thickness of the carbon shell is 1.0 nm to 2.0 nm.

Also, in an embodiment of the present invention, electrochemical catalytic and photocatalytic activity is increased through chemical interaction between the MXene nanodot core and the carbon shell.

Also, in an embodiment of the present invention, the carbon shell imparts oxidation stability characteristics.

Also, in an embodiment of the present invention, the MXene nanodot core-carbon shell multifunctional catalyst is available from pH 0 to pH 14 by the carbon shell.

To accomplish the above object, according to another aspect of the present invention, there is provided a method of preparing a MXene nanodot core-carbon shell multifunctional catalyst, the method including forming a MXene nanosheet by selectively etching an A layer from MAX, forming a MXene nanodot core by hydrothermally synthesizing the MXene nanosheet, and forming a carbon shell while a carbon quantum dot surrounds a surface of the MXene nanodot core by dispersing a carbon precursor source in the MXene nanodot core and performing hydrothermal synthesis.

Also, in an embodiment of the present invention, the MAX is an inorganic compound of a $M_{n+1}AX_n$ composition, and the MXene nanodot core is an inorganic compound of an $M_{n+1}X_n$ composition, wherein M indicates a transition metal, X indicates carbon, nitrogen, or a combination thereof, A includes at least one element selected from among a Group 13 element, a Group 14 element, a Group 15 element, and a Group 16 element, and n is an integer from 1 to 4.

Also, in an embodiment of the present invention, M indicates the transition metal including at least one selected from among Sc, Y, Lu, Ti, Zr, Hf, V, Nb, Ta, Cr, Mo, and W.

Also, in an embodiment of the present invention, A includes at least one selected from among Al, Si, P, S, Ga, Ge, As, Cd, In, Sn, Tl, and Pb.

Also, in an embodiment of the present invention, in forming the MXene nanosheet, a method of selectively etching the A layer is performed by using a strong acid including fluorine (F).

Also, in an embodiment of the present invention, the carbon precursor source includes an ethylene cyanide-based compound, and in this regard, the ethylene cyanide-based compound may include fumaronitrile.

Also, in an embodiment of the present invention, the MXene nanodot core-carbon shell multifunctional catalyst is available from pH 0 to pH 14 by the carbon shell.

According to an embodiment of the present invention, a zero-dimensional MXene nanodot has optical and surface electronic characteristics due to a quantum confinement effect, has a surface functional group capable of acting as an active edge site, and can be applied as an optical, electronic, and electrochemical catalyst and electrode material. Also, structural characteristics and material characteristics of a two-dimensional MXene may be maintained.

According to an embodiment of the present invention, a MXene nanodot core-carbon shell multifunctional catalyst including a MXene nanodot core and a carbon shell surrounding the MXene nanodot core can retain structural characteristics and material characteristics of a MXene nanodot and carbon, and can have an effect of improving physical properties such as stability and electrical characteristics due to a carbon protective film layer. Also, catalytic characteristics are improved due to the synergistic effect between the two materials through chemical interaction of surface functional groups, the catalyst can be applied commonly in pH 0, which is a strong acid, to pH 14, which is a strong alkali, and accordingly, when the catalyst is applied to a photoelectrode material, light absorption and light-harvesting efficiency can be improved, and charge transfer efficiency may also be improved by controlling a surface energy level.

The effects of the present invention are not limited to the above-described effects, and it should be understood that the effects include all effects that can be inferred from the configuration of the invention described in the detailed description of the invention or the claims.

DETAILED DESCRIPTION OF THE INVENTION

Figure 1:
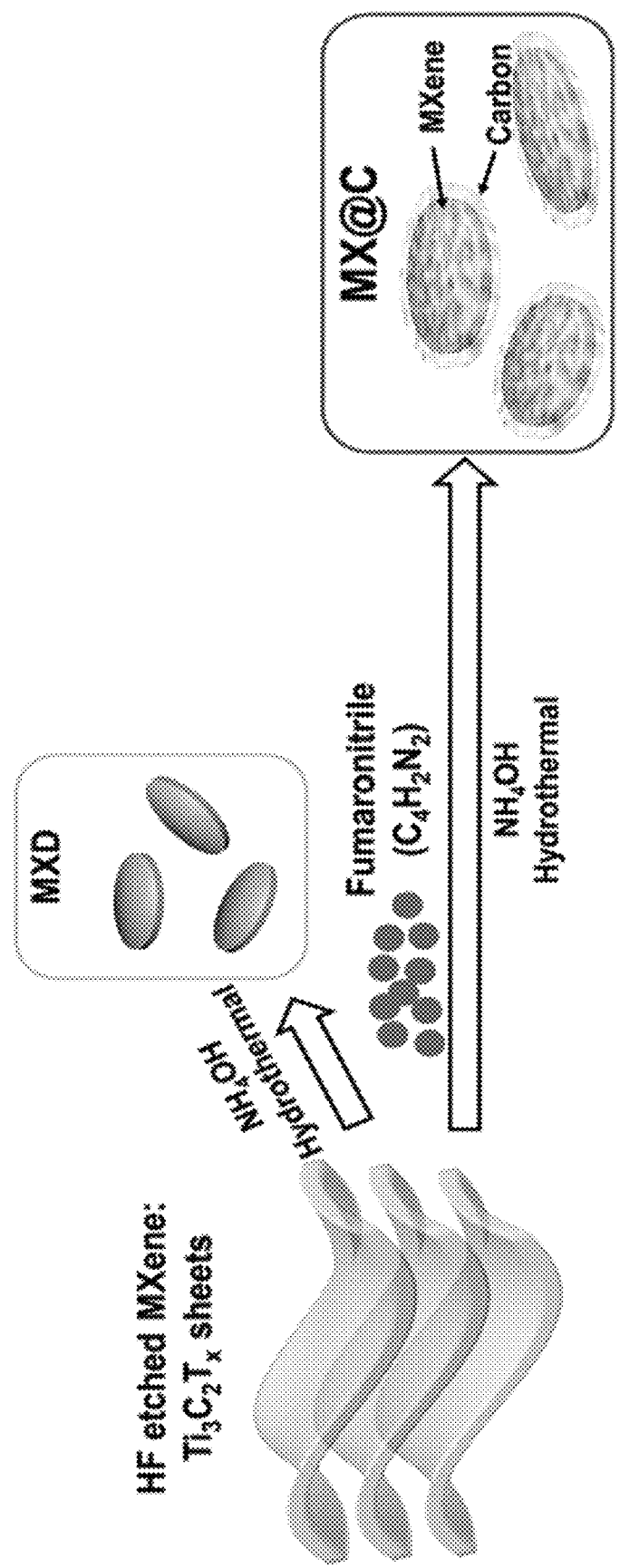
FIG. 1 is a synthesis plan view of a MXene nanodot core (MXD) and a MXene nanodot core-carbon shell (MX@C), according to an embodiment of the present invention.

Hereinafter, the present invention will be described with reference to the accompanying drawings. However, the present invention may be implemented in various forms, and thus, is not limited to the embodiments described herein. In addition, in the drawings, parts irrelevant to the description of the present invention are omitted in order to clearly explain the present invention, and like numerals are used to refer to like elements throughout the specification.

Throughout the specification, when a part is connected (accessed, contacted, or coupled) with other parts, it includes direct connection as well as indirect connection in which the other member is positioned between the parts. In addition, when a part includes other elements, unless explicitly described to the contrary, the word "include" or "comprise", such as "includes", "including", "comprises", or "comprising", will be understood to imply the inclusion of stated elements rather than the exclusion of any other elements.

The term "MXene" used throughout the specification refers to a material including a two-dimensional transition metal carbide or transition metal nitride (Ti3C2 or Ti3N2).

The term "MXene nanodot core-carbon shell", "MXene nanodot core-carbon shell material", "MXene@Carbon hybrid material", and "MX@C" used throughout the specification each refer to a material having a structure including a zero-dimensional MXene nanodot core and a carbon material-containing shell surrounding the zero-dimensional MXene nanodot core.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

As described above, as the demand for eco-friendly energy increases due to environmental problems, a catalyst that may maximize hydrogen energy production efficiency in hydrogen evolution reaction (HER) is in the spotlight as a key element in the future energy industry.

Platinum-based catalysts that are currently commonly used have high performance, but have limitations in inefficiency and low stability, carbon-based catalysts have excellent physical properties, but have low efficiency, and MXene-based catalysts have excellent physical properties, but due to low oxidation stability, application of a surface catalyst is difficult. Also, catalyst material of the related art has limitations in terms of limited uses and a single functionality.

Therefore, through the present invention, based on two-dimensional MXene, a special structure in which carbon surrounds a MXene sheet with a shell structure is to be designed. Therefore, an object of the present invention is to provide to ultimately develop a versatile, multifunctional, high-performance catalyst by having high performance and extending the lifespan of a catalyst by improving stability at the same time, ensuring market competitiveness through cheap materials, and improving electrical characteristics and catalytic characteristics by controlling a surface energy level.

MXene hybrid material surrounded by a carbon shell, which is prepared by a method according to an embodiment of the present invention, may be applied as a multifunctional catalyst for energy conversion, energy storage, fuel cell, petrochemical process, carbon dioxide reduction, ammonia decomposition, nitrogen reduction, water electrolysis, hydrogen production, and the like.

In the present invention, in order to overcome the limitations of platinum-based catalysts of the related art, MXene, which is a transition metal-based catalyst with abundant basic material reserves and excellent physical properties, and carbon material with high application potential are used.

In order to take advantage of each of the advantages by effectively using abundant surface functional groups of MXene and carbon material, carbon surrounds Mxene, which is converted from a two-dimensional sheet into a zero-dimensional nanodot, with a shell structure through etching to prepare thereby a special type of catalyst that did not exist before.

The new type of catalyst thus prepared has a hybrid structure in which a carbon shell having a thickness of 1.6 nm surrounds Mxene of 10 nm to 15 nm as a core, and through the special structure, a hydroxyl group (—OH), a carboxyl group (—COOH), and an ammonium group (—NH4+) of MXene and a hydroxyl group (—OH), pyridinic-N, pyrrolic-N, and graphitic-N of a nonmetallic shell including carbon may chemically interact at the heterojunction.

A zero-dimensional MXene nanodot derived from a two-dimensional MXene has optical and surface electronic characteristics due to a quantum confinement effect, has a surface functional group capable of acting as an active edge site, and may be applied as an optical, electronic, and electrochemical catalyst and electrode material. In this regard, the zero-dimensional MXene nanodot may retain structural characteristics and material characteristics of the two-dimensional MXene. Also, water molecules inserted between two-dimensional MXene hydrophobic layers are evaporated during annealing, such that when the zero-dimensional MXene nanodot is prepared, the structural compressibility is improved and the electrical conductivity is excellent.

In the case of a MXene nanodot core-carbon shell, carbon surrounds a zero-dimensional MXene sheet with a shell structure, and thus, advantages of the two materials may be effectively utilized through a stable interaction by preparing a catalyst having a special structure that creates a synergistic effect due to a transition metal-carbide bond and chemical interaction between surface functional groups of carbon. In this case, both structural characteristics and material characteristics of a MXene nanodot and carbon may be maintained, physical properties such as stability and electrical characteristics are improved due to a carbon protective film layer, and catalytic characteristics are improved by the synergistic effect between the two materials through the chemical interaction between the surface functional groups, such that the Mxene nanodot core-carbon shell is commonly applicable in pH 0, which is a strong acid, to pH 14, which is a strong alkali. Furthermore, when the Mxene nanodot core-carbon shell is applied to photoelectrode material, the light-harvesting efficiency is improved, the charge separation efficiency may be improved by controlling the surface energy level, and the surface catalytic reactivity may be improved.

FIG. 1 is a synthesis plan view of a MXene nanodot core (MXD) and a MXene nanodot core-carbon shell (MX@C), according to an embodiment of the present invention, and a preparing method of the present invention is described with reference to FIG. 1.

In the related art, a MXene nanodot core may be synthesized by using a MXene structure, but there is a problem in that the synthesized MXene nanodot core is unstable due to its high reactivity leading to immediate oxidation, and in the present invention, stability is facilitated by surrounding the synthesized MXene nanodot core with a carbon shell.

In an embodiment of the present invention, as shown in FIG. 1, a MXene nanodot core-carbon shell may be synthesized in a first step reaction. In the reaction, fumaronitrile is added together during a hydrothermal reaction using MXene and NH4OH, thereby facilitating the synthesis of a MXene nanodot core-carbon shell (MX@C).

Hereinafter, the present invention will be described in more detail through Examples, Comparative Examples, and Experimental Examples. However, the present invention is not limited to the following Examples and Comparative Examples.

Example 1

In Example 1, a method of preparing a zero-dimensional MXene nanodot core (MXD) is described.

Two-dimensional MXene (Ti3C2Tx) may be prepared by selectively etching an Al layer of MAX having a Ti3C2Al component, and at this time, HF solution or a solution obtained by dispersing LiF in HCl(LiF+HCL) is available as an etching solution. A specific MXene nanodot may be prepared according to the following procedure.

(1) 1.0 g of MAX powder is slowly added to 10 ml of concentrated HF aqueous solution
(2) Then, the mixture is stirred at 50° C. for 20 hours to etch an Al layer in Ti3C2Al selectively
(3) The suspension obtained through the stirring is washed by using deionized water through centrifugation (3,500 rpm, 10 minutes) to remove excess HF, and this process is continued until the pH of the solution reaches 6
(4) The MXene (Ti3C2Tx) slurry with a neutral pH is immersed in liquid nitrogen for 0.5 hours to be completely frozen so as to maintain its structure, followed by lyophilization for three days to thereby obtain black powder
(5) To perform intercalation of the MXene sample obtained after the lyophilization, 0.3 g of MXene powder is added to 3.6 ml of DMSO, followed by stirring at room temperature for 18 hours
(6) After the intercalation, the solution is centrifuged at 3,000 rpm for 5 minutes to separate and remove the upper DMSO
(7) During the centrifugation, DIW and ethanol are used as solvents and sufficiently dispersed, followed by washing several times to completely remove residual DMSO and by-products
(8) For complete exfoliation of MXene, the MXene after the intercalation is diluted again in 30 ml of a DIW solvent, followed by bath sonication for 2 hours
(9) At this time, to prevent oxidation and structural changes of the MXene thus prepared, bath sonication is performed in a cold water tank while insufflating inert gases such as argon and nitrogen
(10) Ammonia solution is added to the exfoliated MXene solution to bring the pH to about 9, followed by a hydrothermal reaction at 180° C. for 0.5 hours
(11) Immediately after the hydrothermal reaction ends, a process of rapidly lowering temperature to room temperature in the cold water tank is performed (which is one of the factors that control the size of a zero-dimensional MXene nanodot core)
(12) To obtain a zero-dimensional MXene nanodot core, centrifugation is performed at 7,000 rpm for 5 minutes, and then the sample solution is filtered through a polytetrafluoroethylene (PTFE) membrane (having a pore size of 0.2 μm)
(13) The zero-dimensional MXene nanodot core is prepared through centrifugation at 10,000 rpm for an hour at a low temperature of about 5° C.

Through the process, the zero-dimensional MXene nanodot core may be prepared.

Figure 2:
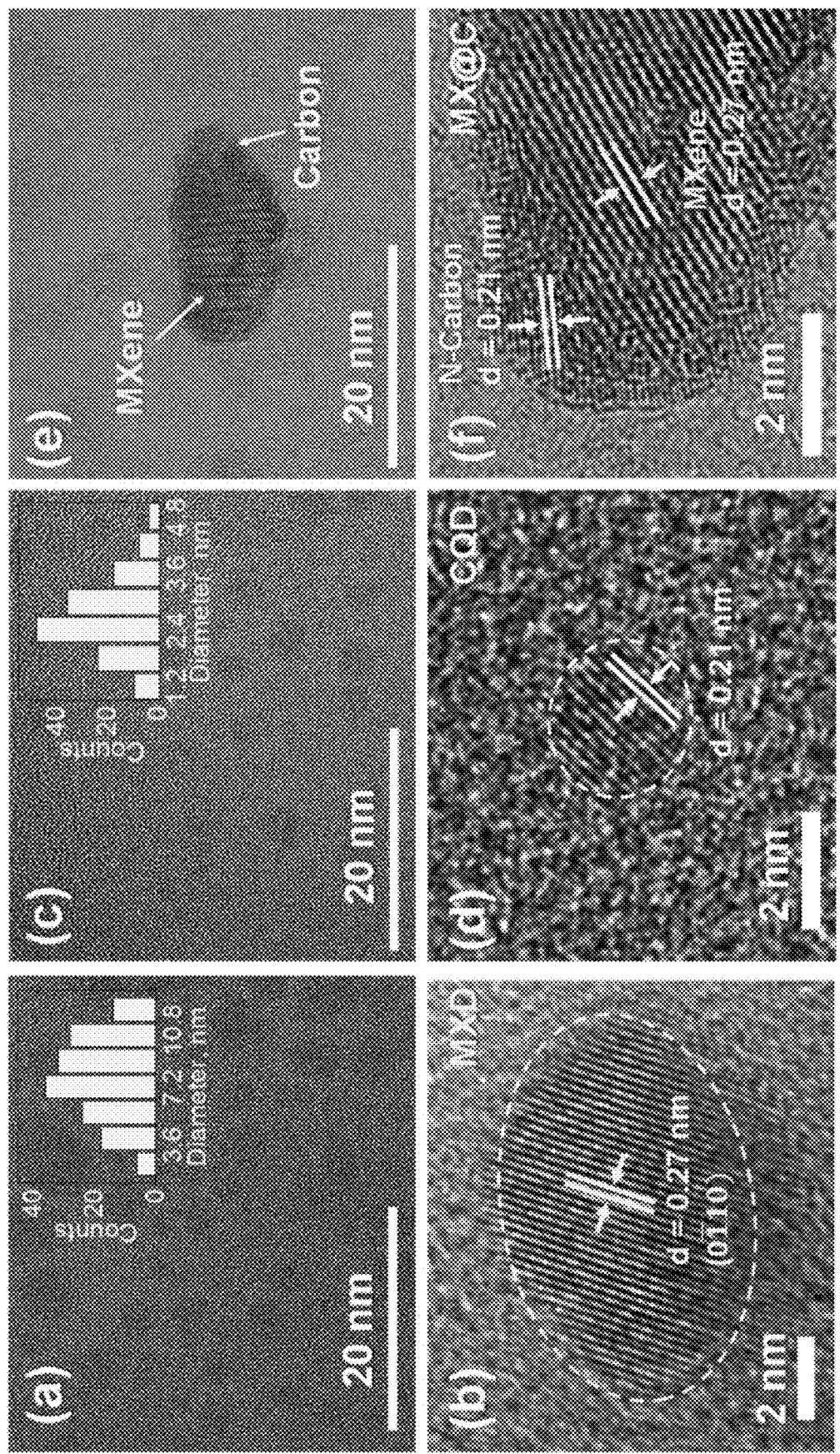
FIG. 2 is a view showing transmission electron microscopy (TEM) and high-resolution transmission electron microscopy (HRTEM) images (a) and (b) of a zero-dimensional MXene nanodot core, TEM and HRTEM images (c) and (d) of a carbon quantum dot (CQD), and TEM and HRTEM images (e) and (f) of a MXene nanodot core-carbon shell, wherein images inserted into (a) and (c) are histograms of the particle size distribution of the MXene nanodot core and the carbon quantum dot (CQD), respectively, according to an embodiment of the present invention.

FIG. 2 is a view showing transmission electron microscopy (TEM) and high-resolution transmission electron microscopy (HRTEM) images (a) and (b) of a zero-dimensional MXene nanodot core, TEM and HRTEM images (c) and (d) of a carbon quantum dot (CQD), and TEM and HRTEM images (e) and (f) of a MXene nanodot core-carbon shell, wherein images inserted into (a) and (c) are histograms of the particle size distribution of the MXene nanodot core and the carbon quantum dot (CQD), respectively, according to an embodiment of the present invention. Hereinafter, the results of confirming a structure of the MXene nanodot core prepared through the process described above will be described with reference to FIG. 2.

As shown in (a) of FIG. 2, the zero-dimensional MXene nanodot core is formed in an almost spherical shape and has an average particle size of 7.3 nm. Also, as shown in (b) of FIG. 2, the lattice spacing of 0.27 nm, which corresponds to the (0110) plane of hexagonal MXene in the zero-dimensional MXene nanodot core, may be seen.

Example 2

In Example 2, a method of preparing a MXene nanodot core-carbon shell (MXene@Carbon, MX@C) is described.

Two-dimensional MXene (Ti3C2Tx) is prepared by selectively etching an Al layer of Ti3C2Al MAX, and at this time, HF solution or a solution obtained by dispersing LiF in HCl(LiF+HCL) is available as an etching solution. Also, the MXene nanodot core-carbon shell may be prepared by adding fumaronitrile from MXene and performing a hydrothermal reaction. The MXene nanodot core-carbon shell may be prepared according to the following procedure.

(1) 0.3 g of fumaronitrile is sufficiently uniformly dispersed in 30 ml of the exfoliated MXene synthesized in Example 1 through stirring for 0.5 hours to an hour to prepare a solution
(2) Ammonia solution is added to the uniformly dispersed solution to bring the pH to about 9, followed by a hydrothermal reaction at a temperature of 180° C. in an autoclave reactor for 0.5 hours
(3) After the hydrothermal reaction ends, a process of rapidly lowering temperature to room temperature in a cold water tank is performed as in Example 1
(4) As in Example 1, centrifugation is performed at 7,000 rpm for 5 minutes, and then the sample solution is filtered through a PTFE membrane (having a pore size of 0.2 μm)
(5) Centrifugation is performed at 10,000 rpm for an hour at a low temperature of about 5° C.

Through the process, the MXene nanodot core-carbon shell (MXene@Carbon) may be prepared.

Figure 3:
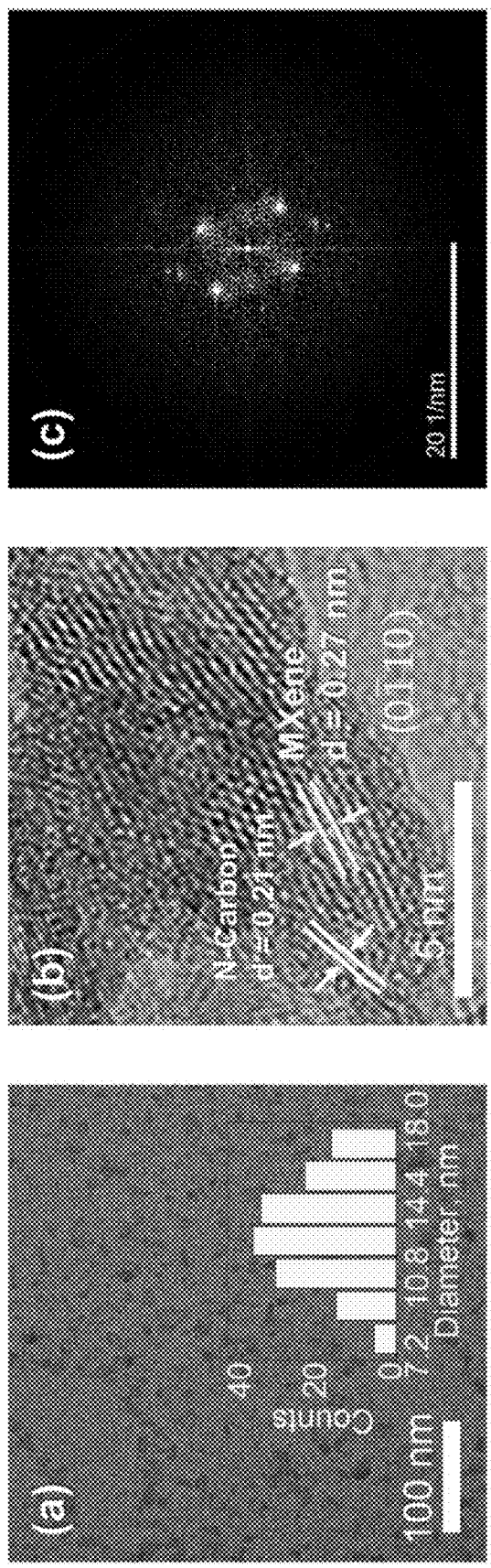
FIG. 3 is a view showing a TEM image (a) including a histogram of the particle size distribution of a MXene nanodot-carbon shell, an HRTEM image (b), and a fast Fourier transform (FFT) image (c), according to an embodiment of the present invention.

FIG. 2 is a view showing TEM and HRTEM images (a) and (b) of a zero-dimensional MXene nanodot core, TEM and HRTEM images (c) and (d) of a carbon quantum dot (CQD), and TEM and HRTEM images (e) and (f) of a MXene nanodot core-carbon shell, wherein images inserted into (a) and (c) are histograms of the particle size distribution of the MXene nanodot core and the carbon quantum dot (CQD), respectively, according to an embodiment of the present invention. FIG. 3 is a view showing a TEM image (a) including a histogram of the particle size distribution of a MXene nanodot-carbon shell, an HRTEM image (b), and a fast Fourier transform (FFT) image (c), according to an embodiment of the present invention.

Hereinafter, a structure of the MXene nanodot core-carbon shell prepared through the process described above is described with reference to FIGS. 2 and 3.

As shown in (e) and (f) of FIG. 2, it may be confirmed that the MXene nanodot core-carbon shell has an elliptical structure, and the lattice structure thereof has two lattice patterns in which the lattice spacing of the carbon shell is 0.21 nm and the lattice spacing of the MXene nanodot core is 0.27 nm.

Also, as shown in FIG. 3, it may be confirmed that the particle size of the MXene nanodot core-carbon shell is 10 nm to 15 nm, and is 12.6 nm on average, and it may also be confirmed that the crystal structure is maintained even after the formation of the composite structure through the FFT image.

Comparative Example 1

In Comparative Example 1, a method of preparing a carbon quantum dot (CQD) is described.

Two-dimensional MXene (Ti3C2Tx) is prepared by selectively etching an Al layer of Ti3C2Al MAX, and at this time, HF solution or a solution obtained by dispersing LiF in HCl is available as an etching solution. The carbon quantum dot (CQD) may be prepared by adding fumaronitrile to the MXene nanodot core synthesized by Example 1 and performing a hydrothermal reaction.

The carbon quantum dot (CQD) may be prepared according to the following procedure.
(1) After dispersion in 35 ml of deionized water as a fumaronitrile precursor of 10 wt %, a homogeneous dispersion is prepared through bath sonication
(2) The homogeneous dispersion sample is subjected to a hydrothermal reaction in an autoclave reactor at 200° C. for 20 minutes
(3) After the hydrothermal reaction ends, a process of rapidly lowering temperature to room temperature in a cold water tank is performed as in Example 1
(4) The precipitate generated after cooling is filtered through a PTFE membrane, and DIW and ethanol are used as solvents and sufficiently dispersed, followed by washing through centrifugation several times to remove residual salt by-products
(5) The prepared solution is immersed in liquid nitrogen for 0.5 hours, followed by lyophilization for three days Through the process, the carbon quantum dot (CQD) may be prepared.

FIG. 2 is a view showing TEM and HRTEM images (a) and (b) of a zero-dimensional MXene nanodot core, TEM and HRTEM images (c) and (d) of a carbon quantum dot (CQD), and TEM and HRTEM images (e) and (f) of a MXene nanodot core-carbon shell, wherein images inserted into (a) and (c) are histograms of the particle size distribution of the MXene nanodot core and the carbon quantum dot (CQD), respectively, according to an embodiment of the present invention.

Hereinafter, the results of confirming the structure of the carbon quantum dot prepared through the process described above will be described with reference to FIG. 2.

As shown in (c) of FIG. 2, it may be confirmed that the carbon quantum dot (CQD) has an oblate shape and has an average particle size of about 2.6 nm. Also, the lattice pattern thereof represents the (100) plane of the graphite domain with an interplanar spacing of 0.21 nm.

Comparative Example 2

In Comparative Example 2, a MXene nanodot-carbon quantum dot (CQD-MXD) complex was prepared. The MXene nanodot-carbon quantum dot complex prepared in Comparative Example 2 is in a state a MXene nanodot and a carbon quantum dot are physically mixed, unlike the MXene nanodot core (MX@C) surrounded by a carbon shell in a chemically bonded state.

The MXene nanodot-carbon quantum dot complex (CQD-MXD) may be prepared according to the following procedure.
(1) The MXene nanodot synthesized in Example 1 and the carbon quantum dot (CQD) solution synthesized in Comparative Example 1 are mixed at a volume ratio of 50:50 and stirred for 30 minutes to form a homogeneous solution
(2) Centrifugation is performed at 7,000 rpm for 5 minutes as in Example 1
(3) The sample solution is filtered through a PTFE membrane (having a pore size of 0.2 μm)
(4) Centrifugation is performed at 10,000 rpm for an hour at a low temperature of about 5° C.

Through the process, the MXene nanodot-carbon quantum dot complex (CQD-MXD) that simply exits in a mixture state without a chemical bonding state may be prepared.

Experimental Example 1

In Experimental Example 1, the bonds within each element were analyzed through X-ray photoelectron spectroscopy (XPS) spectrum experiments of the zero-dimensional MXene nanodot core (MXD), the MXene nanodot core-carbon shell (MX@C), and the carbon quantum dot (CQD), which were respectively formed according to Example 1, Example 2, and Comparative Example 1.

Figure 4:
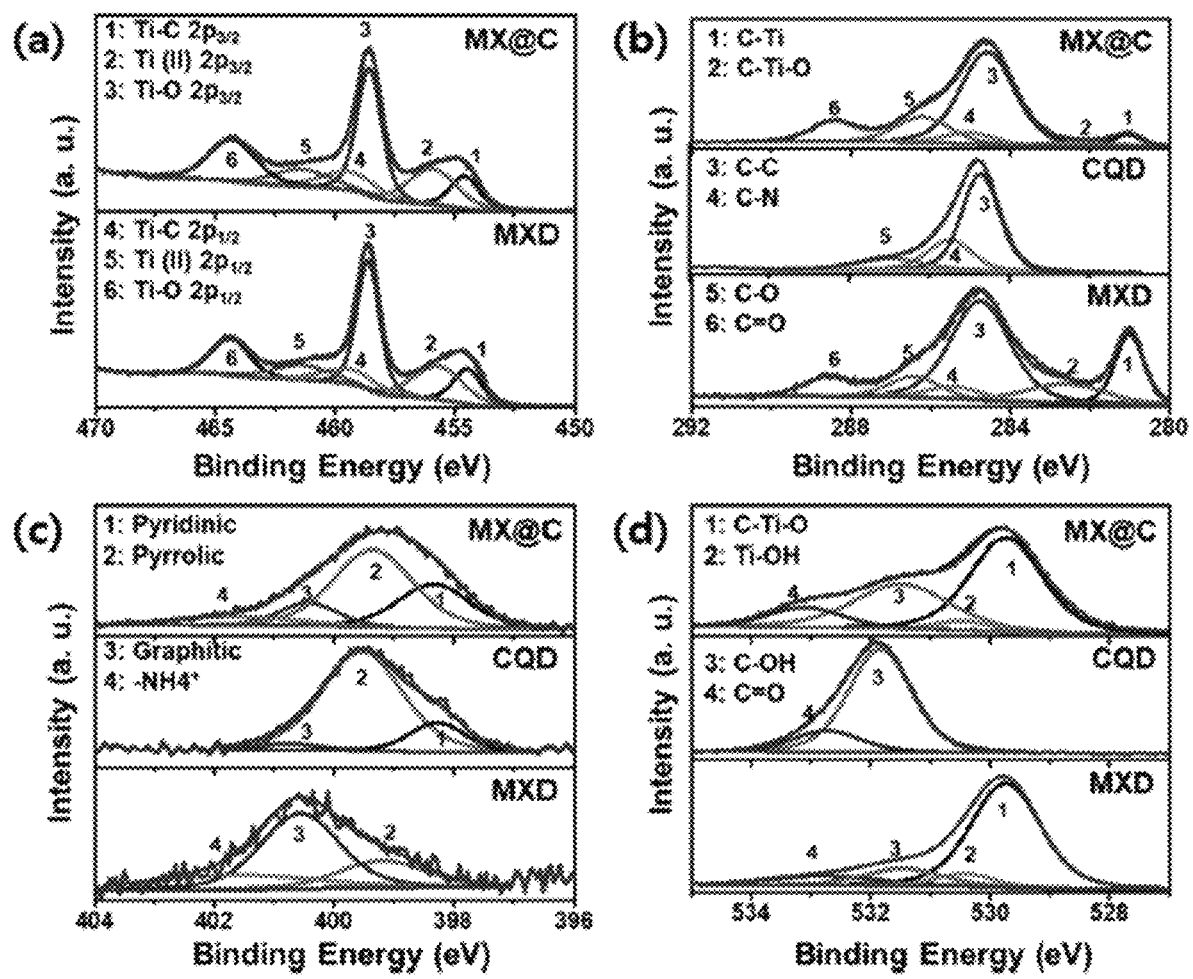
FIGS. 4 and 5 are views showing high-resolution X-ray photoelectron spectroscopy (XPS) spectra of Ti2p(a), C1s (b), N1s(c), and O1s(d) of a zero-dimensional MXene nanodot core, a carbon quantum dot, and a MXene nanodot core-carbon shell, according to an embodiment of the present invention.
Figure 5:
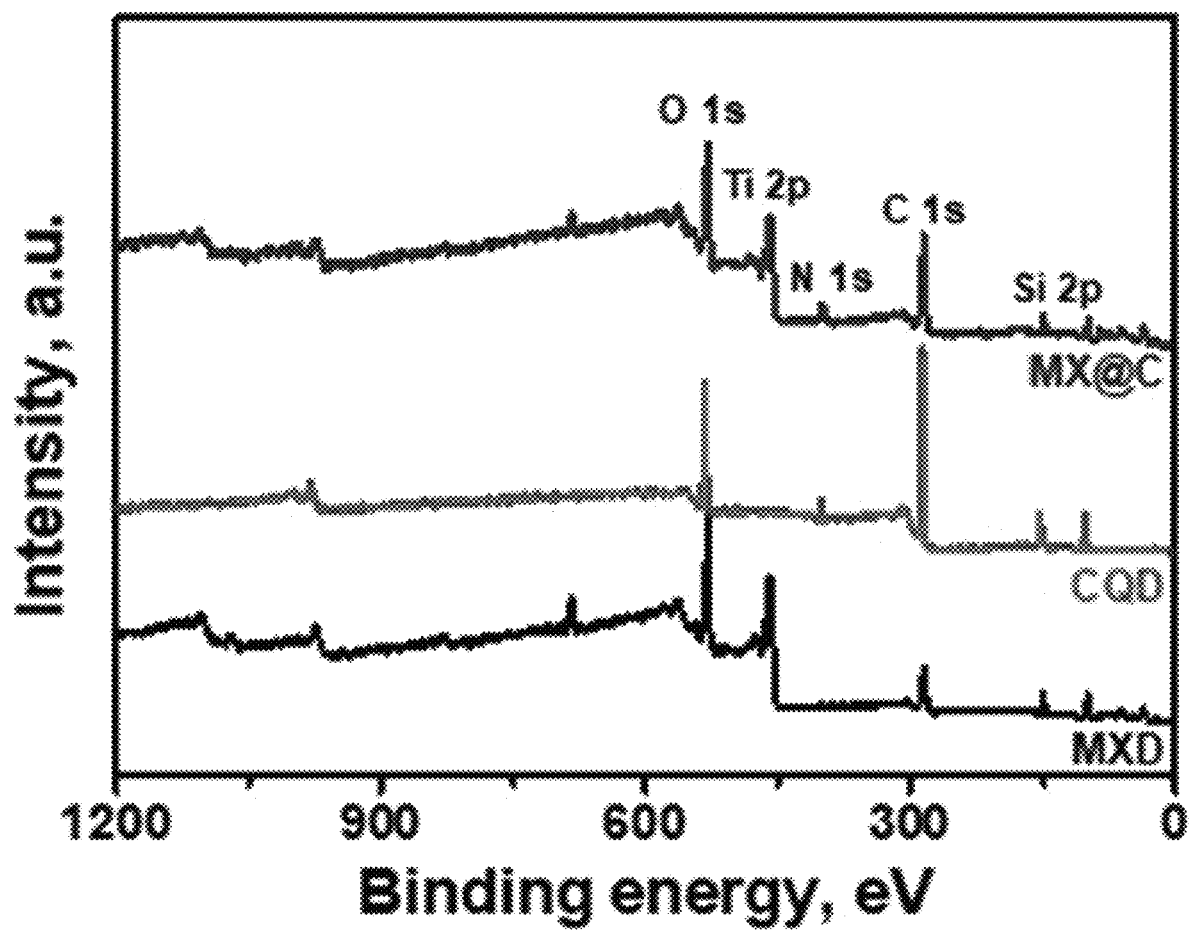

FIGS. 4 and 5 are views showing high-resolution XPS spectra of Ti2p(a), C1s(b), N1s(c), and O1s(d) of a zero-dimensional MXene nanodot core, a carbon quantum dot, and a MXene nanodot core-carbon shell, according to an embodiment of the present invention.

The Ti2p XPS spectrum of FIG. 4 shows a peak shift of 0.15 eV and (b) C1s shows a peak shift of 0.15 eV, which are respectively greater than the values indicating a Ti—C bond in the zero-dimensional MXene nanodot core (MXD). The high binding energy refers to an enhancement of a Ti—C bond while a carbon shell is generated on the surface.

The zero-dimensional MXene nanodot core (MXD) and the carbon quantum dot (CQD) in the C1s XPS spectrum of (b) of FIG. 4 have binding energies of 284.77 eV and 284.72 eV, respectively, whereas the MXene nanodot core-carbon shell (MX@C) shifted to lower binding energy of 284.55 eV. This indicates that there are more sp2 carbon atoms than sp3 carbon atoms due to the crystalline conjugated structure of the carbon shell grown on the surface of the MXene nanodot core-carbon shell.

In the N1s XPS spectrum of (c) of FIG. 4, pyrrolic- and pyridine-type-N-doping and low binding energy shift are due to oxidation of amine groups to reduce Ti—C bonds. This result indicates that an amine moiety at the edge of the zero-dimensional MXene nanodot core (MXD) efficiently attracts an N-terminus of a fumaronitrile molecule used as a precursor of the carbon shell, thereby reducing an amount of amine groups in the MXene nanodot core-carbon shell.

As shown in the O1s spectrum of (d) of FIG. 4, C—Ti—O and Ti—OH bonds of the zero-dimensional MXene nanodot core (MXD) are maintained even after hybridization to the MXene nanodot core-carbon shell. However, phenolic C—OH/C=O type O 1s peaks of the zero-dimensional MXene nanodot core (MXD), the carbon quantum dot (CQD), and the MXene nanodot core-carbon shell (MX@C) are measured at 531.48 eV/532.61 eV, 532.23 eV/533.13 eV, and 531.58 eV/533.01 eV, respectively.

The higher binding energy transfer of a Ti—C bond with respect to the MXene nanodot core-carbon shell indicates an enhancement of the Ti—C bond due to prominent pyrrolic- and pyridine-type-N-doping.

Also, low binding energy transfer indicates softening of amine and phenol groups.

Experimental Example 2

In Experiment Example 2, an experiment was conducted as a catalyst for hydrogen evolution reaction (HER) to check the performance of MX@C prepared according to an embodiment of the present invention as the catalyst. The HER performance as the catalyst was measured by using, as electrolytes, 0.5 M H2SO4 aqueous solution at pH 0, 0.1 M PBS aqueous solution at pH 7, and 1 M KOH aqueous solution at pH 14.

Figure 6:
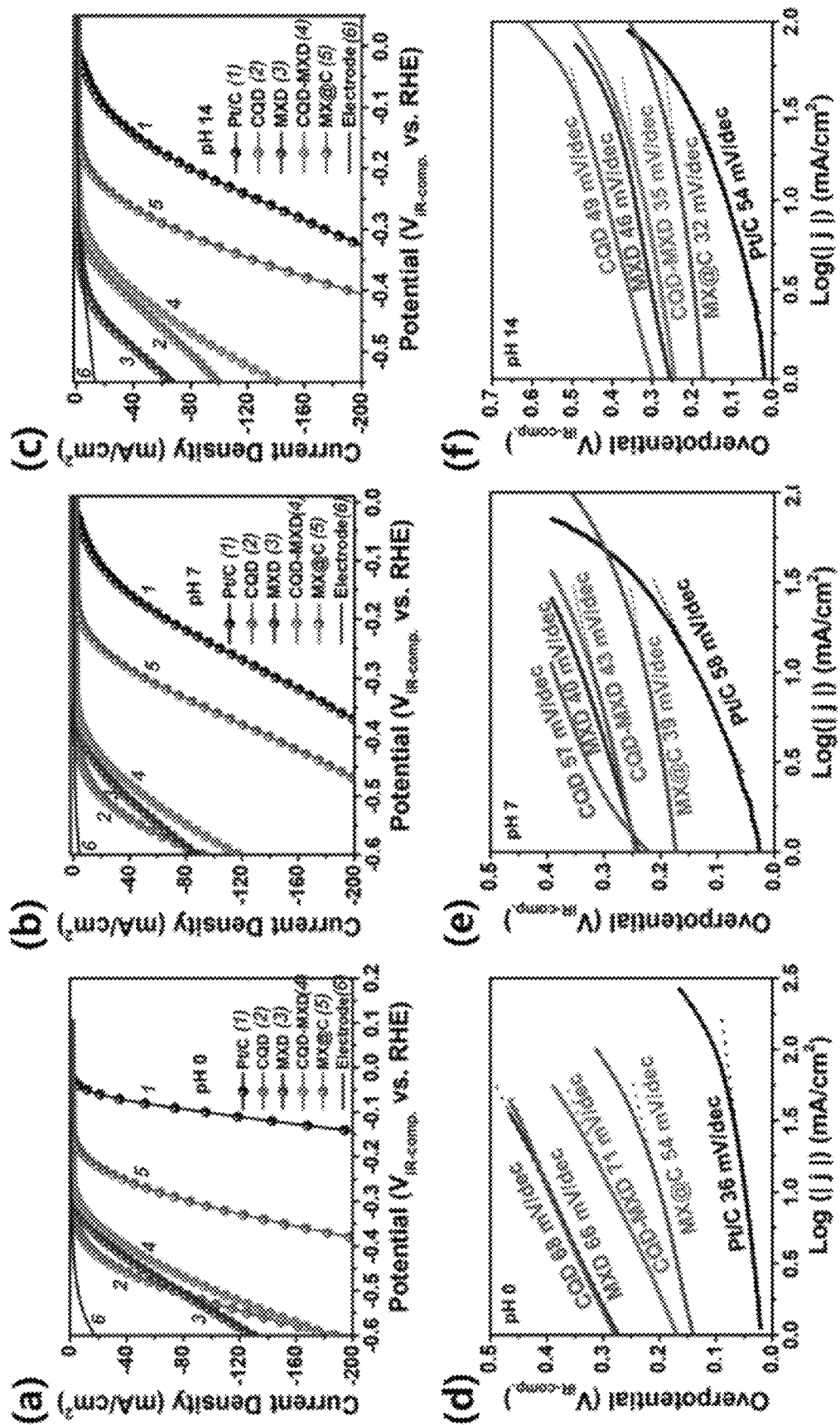
FIG. 6 is a view showing electrochemical performance (a), (b), and (c) and Tafel slopes (d), (e), and (f) of each of a MXene nanodot core (MXD), a carbon quantum dot (CQD), a MXene nanodot-carbon quantum dot complex (CQD-MXD), and a MXene nanodot core-carbon shell sample under pH 0, pH 7, and pH 14 conditions, according to an embodiment of the present invention.

FIG. 6 is a view showing electrochemical performance (a), (b), and (c) and Tafel slopes (d), (e), and (f) of each of a MXene nanodot core (MXD), a carbon quantum dot (CQD), a MXene nanodot-carbon quantum dot complex (CQD-MXD), and a MXene nanodot core-carbon shell (MX@C) sample under pH 0, pH 7, and pH 14 conditions, according to an embodiment of the present invention.

Figure 7:
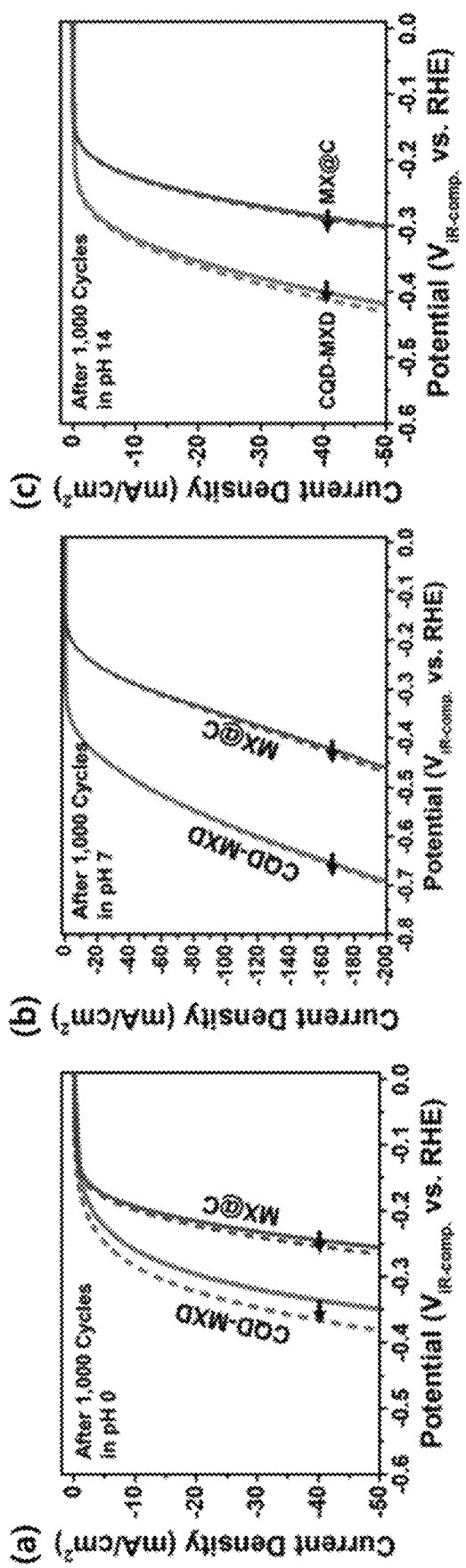
FIG. 7 is a view showing electrochemical performance stability test results (a), (b), and (c) after 1,000 cycles of cyclic voltammetry of a MXene nanodot core-carbon quantum dot complex (CQD-MXD) sample and a MXene nanodot core-carbon shell sample under pH 0, pH 7, and pH 14 conditions, according to an embodiment of the present invention.

FIG. 7 is a view showing electrochemical performance stability test results (a), (b), and (c) after 1,000 cycles of cyclic voltammetry (CV) of a MXene nanodot core-carbon quantum dot complex (CQD-MXD) sample and a MXene nanodot core-carbon shell sample under pH 0, pH 7, and pH 14 conditions, according to an embodiment of the present invention.

Figure 8:
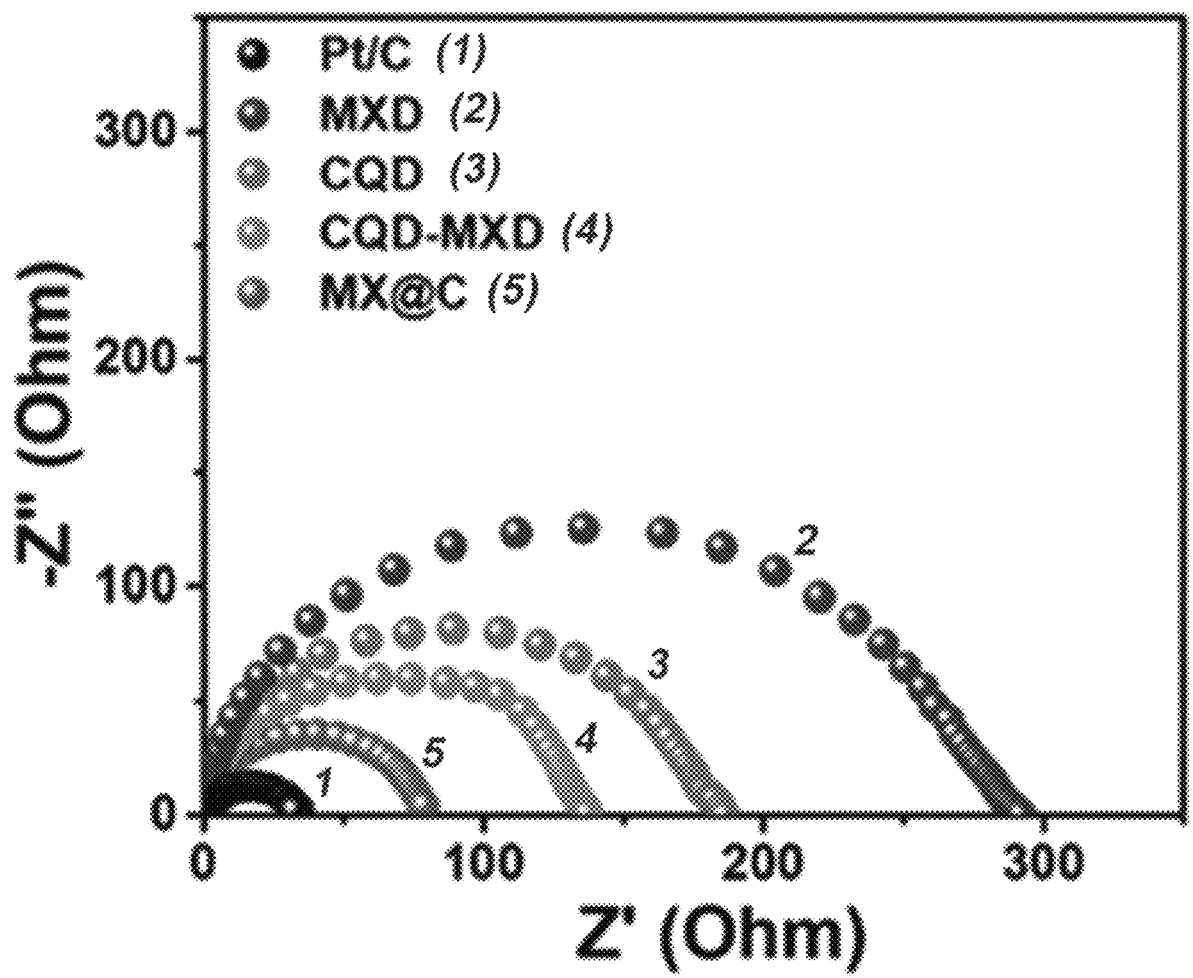
FIG. 8 is a Nyquist plot of each of Pt/C, a MXene nanodot core (MXD), a carbon quantum dot (CQD), a MXene nanodot-carbon quantum dot complex (CQD-MXD), and a MXene nanodot core-carbon shell sample, according to an embodiment of the present invention, according to an embodiment of the present invention.

FIG. 8 is a Nyquist plot of each of Pt/C, a MXene nanodot core (MXD), a carbon quantum dot (CQD), a MXene nanodot core-carbon quantum dot complex (CQD-MXD), and a MXene nanodot core-carbon shell sample, according to an embodiment of the present invention, according to an embodiment of the present invention.

As a detailed experiment method, Pt/C, MXene nanodot core (MXD), carbon quantum dot (CQD), MXene nanodot-carbon quantum dot complex (CQD-MXD), MXene nanodot core-carbon shell (MX@C) catalysts were each dropped on a nickel foam and used as a working electrode, and a glassy carbon electrode (GCE) was used as a counter electrode, Ag/AgCl was used as a reference electrode in acid and neutral aqueous solutions, and Hg/HgO was used as a reference electrode in an alkaline aqueous solution.

As a result, as shown in FIG. 6, the MXene nanodot-carbon quantum dot complex (CQD-MXD) had an overvoltage of 205 mV and a Tafel slope of 32 mV/dec based on 10 mA/cm$^2$ in the alkaline aqueous solution, an overvoltage of 213 mV and a Tafel slope of 39 mV/dec in the neutral aqueous solution, and an overvoltage of 132 mV and a Tafel slope of 54 mV/dec in the aqueous acid solution, and as shown in FIG. 7, even after 1,000 cycles of CV in each solution, there was almost no performance degradation.

Also, as a result of measuring charge transfer resistance by deriving a Nyquist plot through electrochemical impedance spectroscopy (EIS), the MXene nanodot-carbon quantum dot complex (CQD-MXD) had a value of 79Ω.

Experimental Example 3

In Experimental Example 3, an experiment was conducted as an oxygen evolution reaction (OER) co-catalyst. The OER performance as the co-catalyst was measured by a three-electrode system by using 0.1 M phosphate buffer aqueous solution of pH 7 as an electrolyte.

As a detailed experiment method, a MXene@CQD catalyst having a core-shell structure was dropped on a Mo:BiVO$_4$ (BVO)-based photoelectrode material and used as a working electrode, Pt was used as a counter electrode, and Ag/AgCl was used as a reference electrode.

Figure 9:
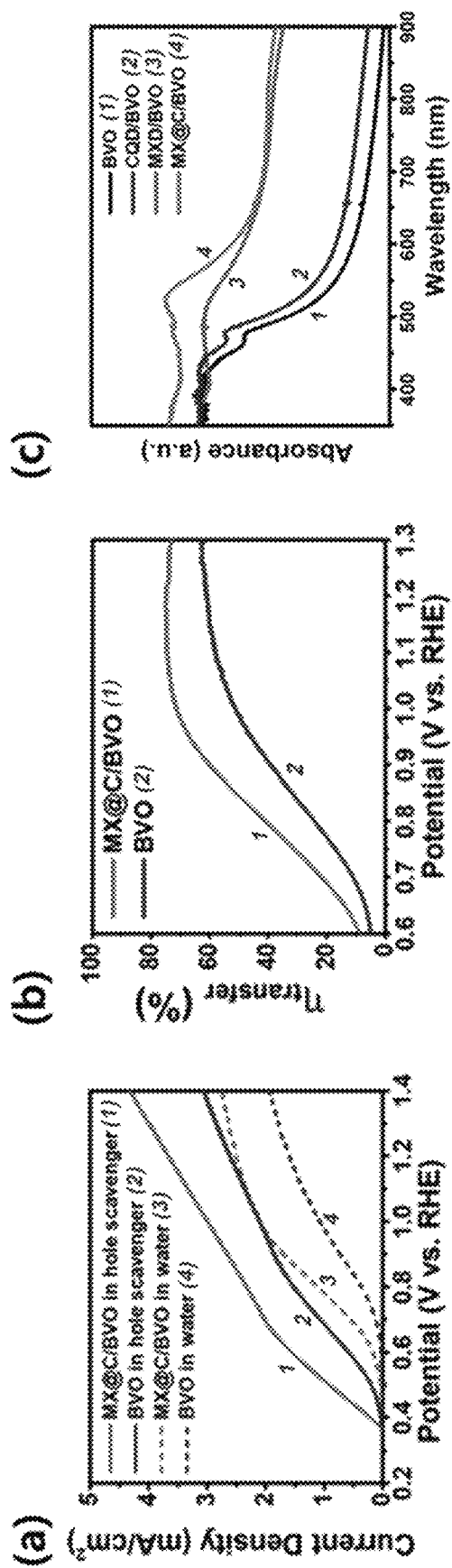
FIG. 9 is a view showing performance (a), electrode-electrolyte charge transfer efficiency (b), and a light absorption spectrum (c) of a sample in which a MXene nanodot core-carbon shell is applied to a $Mo:BiVO_4$ (BVO) photoelectrode, according to an embodiment of the present invention.

FIG. 9 is a view showing performance (a), electrode-electrolyte charge transfer efficiency (b), and a light absorption spectrum (c) of a sample in which a MXene nanodot core-carbon shell is applied to a BVO photoelectrode, according to an embodiment of the present invention.

As a result of the experiment, as shown in FIG. 9, a photocurrent density was 2.56 mA/cm$^2$ improved by 1.53 times at 1.23 V (vs. RHE), the absorbance of light wavelengths from 300 nm to 800 nm was improved, and electrode-electrolyte charge transfer efficiency was improved.

Experimental Example 4

In Experimental Example 4, an experiment was conducted as a catalyst of a MXene nanodot core-carbon shell in an overall water splitting reaction. A two-electrode system measured the performance as the overall water splitting catalyst by using 0.1 M phosphate buffer aqueous solution of pH 7 as an electrolyte.

Figure 10:
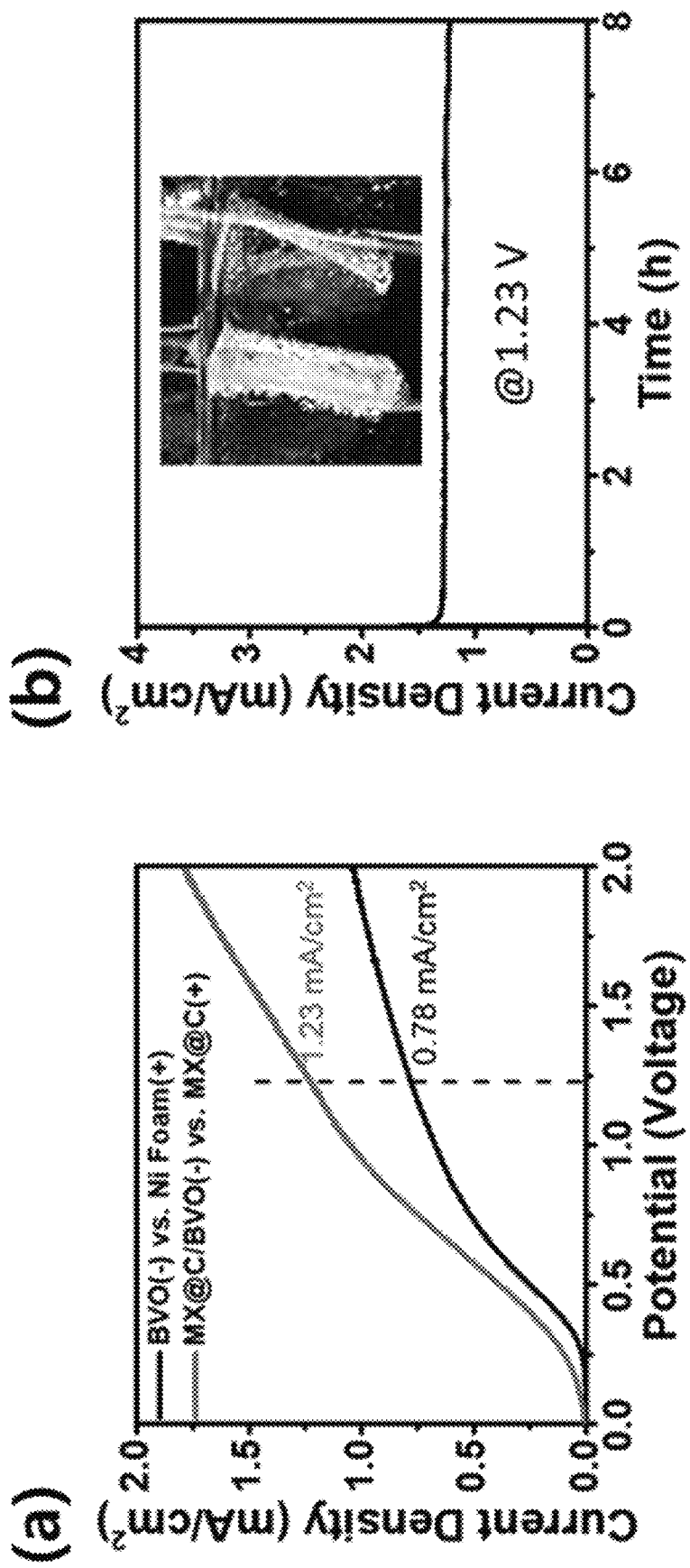
FIG. 10 is a view showing performance (a) and a stability graph (b) of a two-electrode overall water splitting system consisting of a photoanode and a cathode, to which a MXene nanodot core-carbon shell is applied, according to an embodiment of the present invention.

FIG. 10 is a view showing performance (a) and a stability graph (b) of a two-electrode overall water splitting system consisting of a photoanode and a cathode, to which a MXene nanodot core-carbon shell is applied, according to an embodiment of the present invention.

As a result of the experiment, as shown in FIG. 10, in the case of using a MXene nanodot core-carbon shell as a catalyst, the photocurrent density was 1.23 mA/cm$^2$ improved by 1.57 times at 1.23 V (vs. RHE), the stability was confirmed without performance degradation even after using it 8 hours or more, the MXene nanodot core-carbon shell catalyst had improved catalytic effects in a wide pH range based on its unique special bonding structure, and the stability and electrical characteristics were improved.

In other words, through the unique multifunctionality of the MXene nanodot core-carbon shell, the MXene nanodot core-carbon shell may be applied to not only HER catalyst but also OER, fuel cell, carbon dioxide reduction, ammonia decomposition, petrochemical process, carbon dioxide emission reduction, energy conversion, and energy storage, and may be used in a wide pH range.

The above description of the present disclosure is intended to provide examples, and it would be understood by those of skilled in the art that modifications may be easily made into other specific forms without changing technical concept and essential features of the present invention. Therefore, it should be understood that the embodiments described above are only exemplary and are not limited. For example, each component described as a single type may be implemented in a distributed manner, and likewise components described as distributed may be implemented in a combined form.

The scope of the present invention is represented by the claims, and should be interpreted that the meaning and scope of the claims and all the changes or modified forms derived from the equivalents thereof come within the scope of the present invention.

What is claimed is:

1. A MXene nanodot core-carbon shell multifunctional catalyst comprising:
   a MXene nanodot core that is a zero-dimensional nanomaterial; and
   a carbon shell surrounding the MXene nanodot core.

2. The MXene nanodot core-carbon shell multifunctional catalyst of claim 1, wherein the MXene nanodot core is an inorganic compound comprising an $M_{n+1}X_n$ composition,
wherein M indicates transition metal, X indicates carbon, nitrogen, or a combination thereof, and n is a natural number from 1 to 4.

3. The MXene nanodot core-carbon shell multifunctional catalyst of claim 2, wherein M indicates the transition metal comprising at least one selected from among Sc, Y, Lu, Ti, Zr, Hf, V, Nb, Ta, Cr, Mo, and W.

4. The MXene nanodot core-carbon shell multifunctional catalyst of claim 1, wherein a diameter of the MXene nanodot core is 10 nm to 15 nm.

5. The MXene nanodot core-carbon shell multifunctional catalyst of claim 1, wherein a thickness of the carbon shell is from 1.0 nm to 2.0 nm.

6. The MXene nanodot core-carbon shell multifunctional catalyst of claim 1, wherein electrochemical catalytic and photocatalytic activity is increased through chemical interaction between the MXene nanodot core and the carbon shell.

7. The MXene nanodot core-carbon shell multifunctional catalyst of claim 1, wherein the carbon shell imparts oxidation stability characteristics.

8. The MXene nanodot core-carbon shell multifunctional catalyst of claim 1, wherein the MXene nanodot core-carbon shell multifunctional catalyst is available from pH 0 to pH 14 by the carbon shell.

9. A method of preparing a MXene nanodot core-carbon shell multifunctional catalyst, the method comprising:
forming a MXene nanosheet by selectively etching an A layer from MAX; forming a MXene nanodot core by hydrothermally synthesizing the MXene nanosheet; and
forming a carbon shell while carbon surrounds a surface of the MXene nanodot core by dispersing a carbon precursor source in the MXene nanodot core and performing hydrothermal synthesis.

10. The method of claim 9, wherein the MAX is an inorganic compound comprising an $M_{n+1}AX_n$ composition, the MXene nanodot core is an inorganic compound comprising an $M_{n+1}X_n$ composition,
wherein M indicates a transition metal, X indicates carbon, nitrogen, or a combination thereof, the A layer comprises at least one element selected from among a Group 13 element, a Group 14 element, a Group 15 element, and a Group 16 element, and n is an integer from 1 to 4.

11. The method of claim 10, wherein M indicates transition metal comprising at least one selected from among Sc, Y, Lu, Ti, Zr, Hf, V, Nb, Ta, Cr, Mo, and W.

12. The method of claim 10, wherein the A layer comprises at least one selected from among Al, Si, P, S, Ga, Ge, As, Cd, In, Sn, Tl, and Pb.

13. The method of claim 9, wherein, in forming the MXene nanosheet, a method of selectively etching the A layer is performed by using a strong acid comprising fluorine (F).

14. The method of claim 9, wherein, in forming the carbon shell, the carbon precursor source comprises an ethylene cyanide-based compound.

15. The method of claim 14, wherein the ethylene cyanide-based compound comprises fumaronitrile.

16. The method of claim 9, wherein the MXene nanodot core-carbon shell multifunctional catalyst is available from pH 0 to pH 14 by the carbon shell.

* * * * *